US006898046B2

(12) United States Patent
Sri-Jayantha et al.

(10) Patent No.: US 6,898,046 B2
(45) Date of Patent: May 24, 2005

(54) METHOD AND SYSTEM FOR ROTATIONAL VELOCITY-BASED ALGORITHM FOR VIBRATION COMPENSATION IN DISK DRIVES

(75) Inventors: Sri M. Sri-Jayantha, Ossining, NY (US); Hien Dang, Nanuet, NY (US); Arun Sharma, New Rochelle, NY (US); Isao Yoneda, Yokohama (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 406 days.

(21) Appl. No.: 10/153,684

(22) Filed: May 24, 2002

(65) Prior Publication Data
US 2003/0218822 A1 Nov. 27, 2003

(51) Int. Cl.[7] .............................................. G11B 5/596
(52) U.S. Cl. ................................. 360/77.02; 360/77.03; 360/78.11
(58) Field of Search .......................... 360/60, 75, 77.01, 360/77.02, 77.03, 78.01, 78.04, 78.11, 77.05, 77.08; 310/51; 318/459, 621, 632; 388/928.1; 327/551–552, 555–558, 564

(56) References Cited

U.S. PATENT DOCUMENTS

| 5,400,196 A | | 3/1995 | Moser et al. |
| 5,402,400 A | * | 3/1995 | Hamada et al. .......... 360/78.06 |
| 5,426,545 A | | 6/1995 | Sidman et al. |
| 5,608,586 A | | 3/1997 | Sri-Jayantha et al. |
| 5,721,457 A | | 2/1998 | Sri-Jayantha et al. |
| 6,088,185 A | * | 7/2000 | Ratliff et al. ............ 360/77.03 |
| 6,122,139 A | | 9/2000 | Sri-Jayantha et al. |
| 6,597,532 B1 | * | 7/2003 | Usui et al. ............... 360/97.03 |
| 6,754,019 B2 | * | 6/2004 | Tokizono et al. ............ 360/53 |

FOREIGN PATENT DOCUMENTS

JP          2565637          10/1996

OTHER PUBLICATIONS

Charlie Hernden, "Vibration Cancellation Using Rotational Accelerometer Feedforward in HDDS", Data Storage, Nov. 2000, 4 Pages Total.
Jinzenji et al., :Acceleration Feedforward Control Against Rotational Disturbance in Hard Disk Drives ,APMRC, Nov. 6–8, 2000, TA6–01–TA6–02, 2 Pages Total.
Jinzenji et al., "Acceleration Feedforward Control Against Rotational Disturbance in Hard Disk Drives", IEEE 2001, Nov. 22, 2000, 6 Pages Total.

* cited by examiner

*Primary Examiner*—Sinh Tran
*Assistant Examiner*—Jason Olson
(74) *Attorney, Agent, or Firm*—McGinn & Gibb; Thomas R. Berthold

(57) ABSTRACT

A disk drive (HDD) (and method) subject to linear and rotational vibration, includes an independent sensing unit for sensing a rotational velocity component of the rotational vibration in a predetermined frequency range, and an optimal filter combination for receiving an output from the sensing unit.

20 Claims, 14 Drawing Sheets

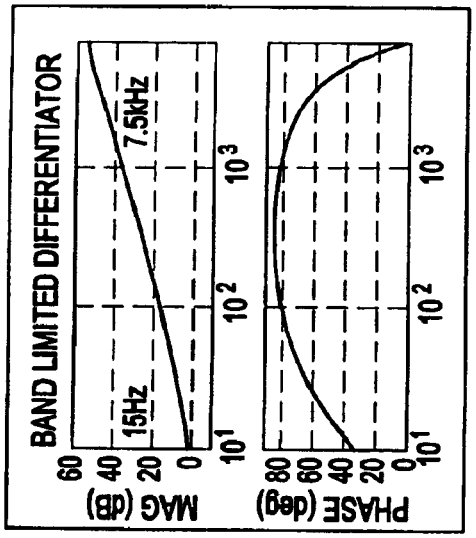
FIG.4(c)
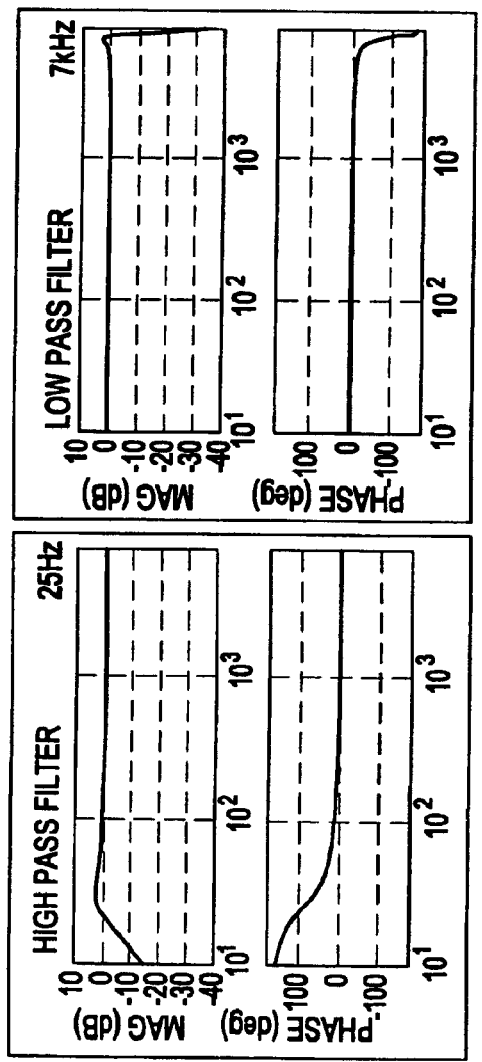
FIG.4(b)
FIG.4(a)
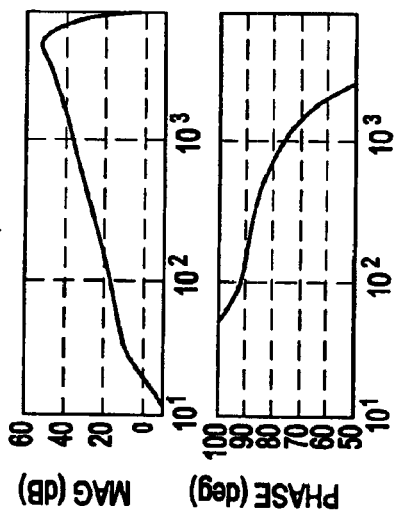
FIG.4(d)

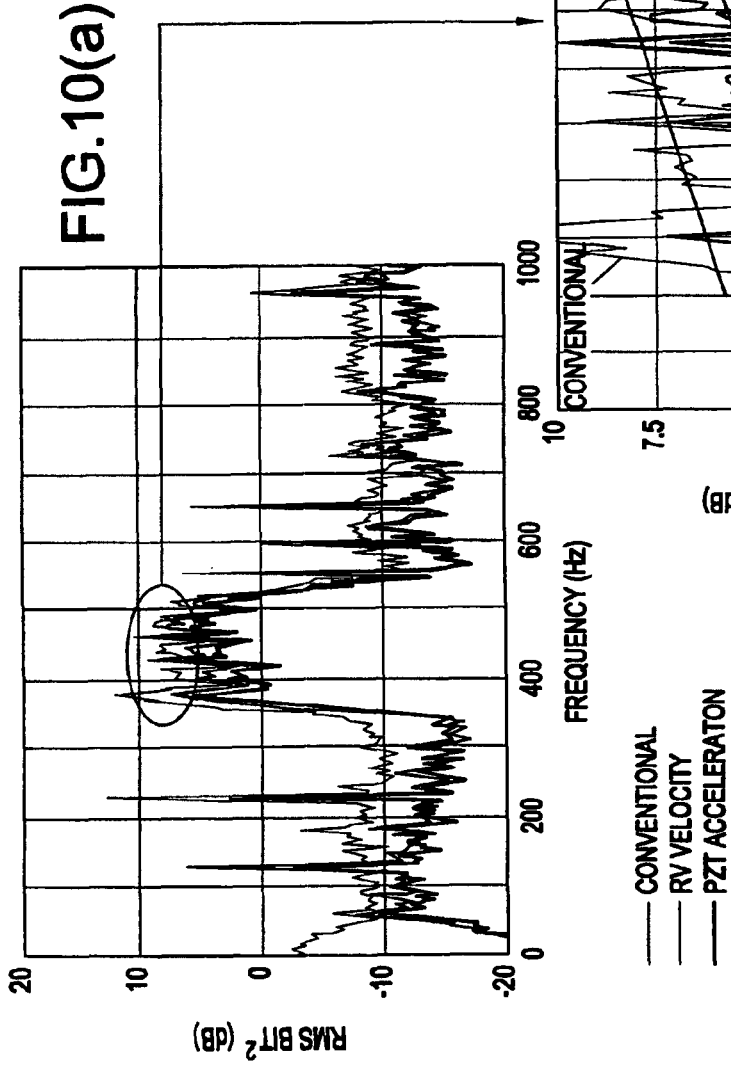
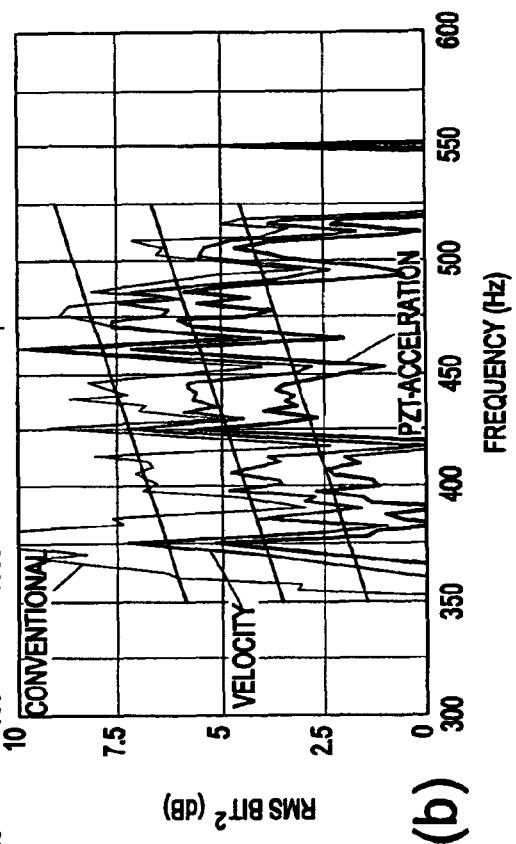
FIG.10(a)
FIG.10(b)

METHOD AND SYSTEM FOR ROTATIONAL VELOCITY-BASED ALGORITHM FOR VIBRATION COMPENSATION IN DISK DRIVES

CROSS-REFERENCE TO RELATED APPLICATION

The present application is related to U.S. patent application Ser. No. 10/153,687 filed concurrently herewith, to Sri M. Sri-Jayantha et al. entitled "ROTATIONAL VIBRATION VELOCITY SENSOR FOR DISK DRIVES", assigned to the present assignee, and incorporated herein by reference.

BACKGROUND OF THE INVENTION

1. Field of the Invention

The present invention generally relates to a disk drive, and more particularly to a disk drive which minimizes the track misregistration (TMR) error produced by theta-dynamics by a rotational velocity sensor using a novel algorithm.

2. Description of the Related Art

As track density continues to grow, vibration-induced track following error component becomes highly critical to the operation of a disk drive. The effective data rate throughput is degraded in the presence of rotational vibration. At high density (e.g., high number of tracks per inch (TPI)), the in-plane rotational vibration (e.g., theta coordinate) of a disk drive, referred to as "theta-dynamics", directly impacts the track misregistration (TMR) component.

A solution to this vibration challenge can be developed along several disciplines, ranging from novel mount systems to sophisticated sensors and servo algorithms.

A computer system may include one or more disk drives where each drive contributes to the total vibration environment. In addition, a computer system itself may be subjected to external seismic excitations. Head positioning accuracy in a disk drive is prone to both self-generated vibration and to vibration generated by a neighboring disk drive or other peripherals attached to the same mounting structure.

The present generation of 1.0", 2.5" and 3.5" hard disk drives (HDDs) are designed to operate in portable and desk-top/server environments, respectively. To reduce cost and weight of a computer system, manufacturers typically fabricate the HDD mounting frame utilizing thin structural members. Therefore, a computer frame is a compliant object which makes it susceptible to vibration. Such a mounting configuration makes a disk drive vulnerable to vibration excited by internal or external sources. An HDD with a rotary actuator system is highly sensitive to in-plane rotational vibration (RV) of its base plate.

A head positioning servo system in an HDD performs three critical tasks.

First, the servo system moves the head to the vicinity of a target in a minimum time using a velocity servo under seek mode. Next, it positions the head on the target track with minimum settle-out time using a position controller without an integrating term (e.g., capability) in it. Finally, the servo system enters the track follow mode with a proportional-integral-derivative type (PID) position controller.

However, during the seek mode, maximum rotational acceleration torque followed by a deceleration torque is imparted by a voice coil motor (VCM)-based actuator. The corresponding reaction torque on the base-plate causes transient rotational vibration that can be detrimental to the positioning accuracy of the read/write heads. However, the presence of random vibration impacts the track following precision (and, slightly less, the settle-out performance). Prior to the present invention, there has been no adequate addressing of the problem of random vibration as it critically affects the track following precision of an HDD actuator system.

Present 3.5" disk drives have reached 40 kTPI, and after year 2001 it is expected to grow beyond 50 kTPI. A major obstacle to raising the track density is inadequate head positioning accuracy in the presence of vibration disturbances. Due to exponential growth in TPI, positioning the read/write elements over a track has become a major challenge. Conventional servo control system requires continuous innovations to perform well under increasingly difficult operating conditions.

The mechanical components such as spindle motor assemblies are not perfectly mass-balanced, and during operation they produce harmonic vibration. Harmonic vibration excitation produces both a linear and a rotational oscillatory motion of the entire HDD system. When not compensated, a track following error of 15% of the track pitch can be detrimental to a disk drive's "soft" and "hard" error rate performance. The positioning error due to this internally produced periodic vibration can be solved using a servo method disclosed in U.S. Pat. No. 5,608,586, incorporated herein by reference.

By using special shock and vibration isolation mount design, the rotational oscillatory components due to internal spindle forcing can be minimized as taught by U.S. Pat. No. 5,400,196, incorporated herein by reference. However, a mount design optimized to decouple internal spindle vibration as covered by the U.S. Pat. No. 5,400,196, remains susceptible to external input vibration. By deploying the isolation mounts along a polygon satisfying a particular set of criteria defined by Japanese Patent No. 2,565,637, the external vibration inputs generating rotational vibration on an HDD can be minimized.

In U.S. Pat. No. 6,122,139, also incorporated herein by reference, a method to neutralize the reaction by generating a counter torque using a secondary actuator is proposed. An HDD with a novel sensing and control solution could provide an enhancement to the problem of random vibration.

By deploying dual PZT sensors 101, 102, as shown in FIG. 1, and a signal conditioning algorithm, a conventional system 100 (e.g., see A. Jinzenji et al. "Acceleration feedforward control against rotational disturbance in hard disk drives," APMRC—Nov. 6–8 2000, TA6-01-TA6-02; U.S. Pat. No. 5,426,545 to Sidman et al., incorporated herein by reference) demonstrates a feedforward solution to random vibration. PZT sensors 101, 102 by themselves do not produce high quality output without additional innovation. FIG. 1 also illustrates a feedforward compensator 103 and a conventional servo 104.

As shown in FIGS. 2A–2C, U.S. Pat. No. 5,721,457, incorporated herein by reference, shows a dual PZT configuration 201, 202 in a disk drive where the mass and inertia of the disk drive is exploited as the seismic body to measure angular and linear acceleration with substantial sensitivity.

That is, FIG. 2(a) illustrates a head disk assembly 200, FIG. 2(b) illustrates in greater detail the piezoelectric strain sensor 201, 202 for measuring acceleration, and FIG. 2(c) illustrates the head disk assembly 200 on a userframe 204 undergoing shock and vibration, with the dual PZTs 201, 202 providing an angular and linear acceleration inputs to a component 205, thereby resulting in a write inhibit signal being issued.

Another challenge in the use of PZTs is that they are sensitive to strain along multiple axes, and therefore they respond to vibration inputs in addition to the theta-dynamics.

To produce high fidelity signals in the range of 100–1000 Hz, the size of a PZT configuration must be large and such a design is not compatible with the electrical card height and manufacturing requirements in a disk drive. On the other hand, reducing the PZT volume produces poor signal quality (i.e., particularly the signal drift in the low frequency range (~100 Hz) is not easily stabilized).

The measurement-based experience of the present inventors is that the signal stability and noise are key problems in employing a compact PZT configuration. Sudden drift in a PZT signal can cause undesirable write-abort condition. Use of dual PZTs further complicates the problem of matching the individual PZT gain and thermal sensitivity. By providing novel mechanical structures, the sensitivity of a PZT can be enhanced along the desired direction and minimized along the remaining directions. However, this requirement makes the sensor cost prohibitive for a disk drive application.

An alternative approach uses a capacitive sensing micromechanical device (e.g., see C. Hernden, "Vibration cancellation using rotational accelerometer feedforward in HDDs," Data Storage, November, 2000, pp. 22–28), which attempts to produce a quality theta-acceleration sensor. However, sensor size, bandwidth and cost are considered to be limitations of a microelectromechanical sensor (MEMS).

Thus, the conventional methods and system have been unable to deal adequately with the problem of random vibration, as it critically affects the track following precision of an HDD actuator system. Further, there has been no known method or system for minimizing the track misregistration error produced by theta-dynamics with an algorithm that uses a rotational velocity sensor.

SUMMARY OF THE INVENTION

In view of the foregoing and other problems, drawbacks, and disadvantages of the conventional methods and structures, an object of the present invention is to provide a method and structure in which the problem of random vibration, as it critically affects the track following precision of an HDD actuator system, is addressed.

Another object of the present invention is to minimize the TMR error produced by theta-dynamics with an algorithm that uses a rotational velocity sensor.

In a first aspect of the present invention, a disk drive (HDD) subject to linear and rotational vibration, includes an independent sensing unit for sensing a rotational velocity component of the rotational vibration in a predetermined frequency range, and an optimal filter combination for receiving an output from the independent sensing unit.

In a second aspect of the present invention, a method of vibration compensation in a disk drive, includes extracting a velocity component in a mid-frequency range, and generating a control signal that reduces track following positioning error.

In a third aspect of the present invention, a method of measuring vibration in a disk drive system having a baseplate, includes deriving a back-electromotive force (EMF) voltage emanating from a sensor which is delivering back-EMF proportional to angular velocity components of the baseplate from the sensor.

In a third aspect of the present invention, a method of measuring vibration in a disk drive system having a baseplate, includes deriving a back-electromotive force (EMF) voltage emanating from a sensor which is delivering back-EMF proportional to angular velocity components of the baseplate from the sensor.

In a fourth aspect of the present invention, a disk drive system, includes a main voice coil motor, and a back-electromotive force (EMF) sensor which is rotatable around a point and is substantially insensitive to linear vibration which selectively shares a flux of the main voice coil motor (VCM).

With the invention, it has been recognized that rigid body motion of the base plate of a disk drive can take place along three linear (X, Y, Z) and three angular (phi, psi, theta) coordinates. Rotational vibration of the base-plate in theta plane causes tracking error due to finite level of servo feedback gain that is available in a disk drive.

By sensing the angular velocity of the base plate by a single integrated magnetic electro motive force (EMF) sensor and by modifying the sensed velocity by a band-limited differentiator (BLDIF), a feedforward control algorithm is provided to reduce the tracking error substantially.

In contrast with the conventional systems using a piezoelectric (PZT) sensor-based acceleration feedforward solution, the magnetic velocity sensing of the invention is less prone to undesirable vibration pick up such as the linear vibration at the HDD.

Further, since the sensor is operated in a voltage sensing mode with virtually zero current flow, the signal conditioning requirements are less stringent, it is less sensitive to thermally-induced resistance variation, and less costly compared to a charge generation-based PZT sensor method.

Thus, the rotational vibration (RV) velocity-based servo compensation method of the present invention is advantageous over the conventional arrangements.

BRIEF DESCRIPTION OF THE DRAWINGS

The foregoing and other purposes, aspects and advantages will be better understood from the following detailed description of a preferred embodiment of the invention with reference to the drawings, in which:

FIGS. 4(a)–4(d) illustrate elements of the feed forward loop (algorithm) of FIG. 3, including a high pass filtering (FIG. 4(a)), a low pass filtering (FIG. 4(b)), a band-limited differentiation operation (FIG. 4(c)), and a composite transfer function of FIGS. 4(a)–4(c) (FIG. 4(d)), respectively;

FIGS. 10(a)–10(b) illustrate a frequency spectrum of PES corresponding to each control and sensing configuration;

FIG. 11(a) illustrates a sinusoidal angular vibration input, FIG. 11(b) illustrates a conventional track following, and FIG. 11(c) illustrates a velocity-sensing track following;

DETAILED DESCRIPTION OF PREFERRED EMBODIMENTS OF THE INVENTION

Figure 1:
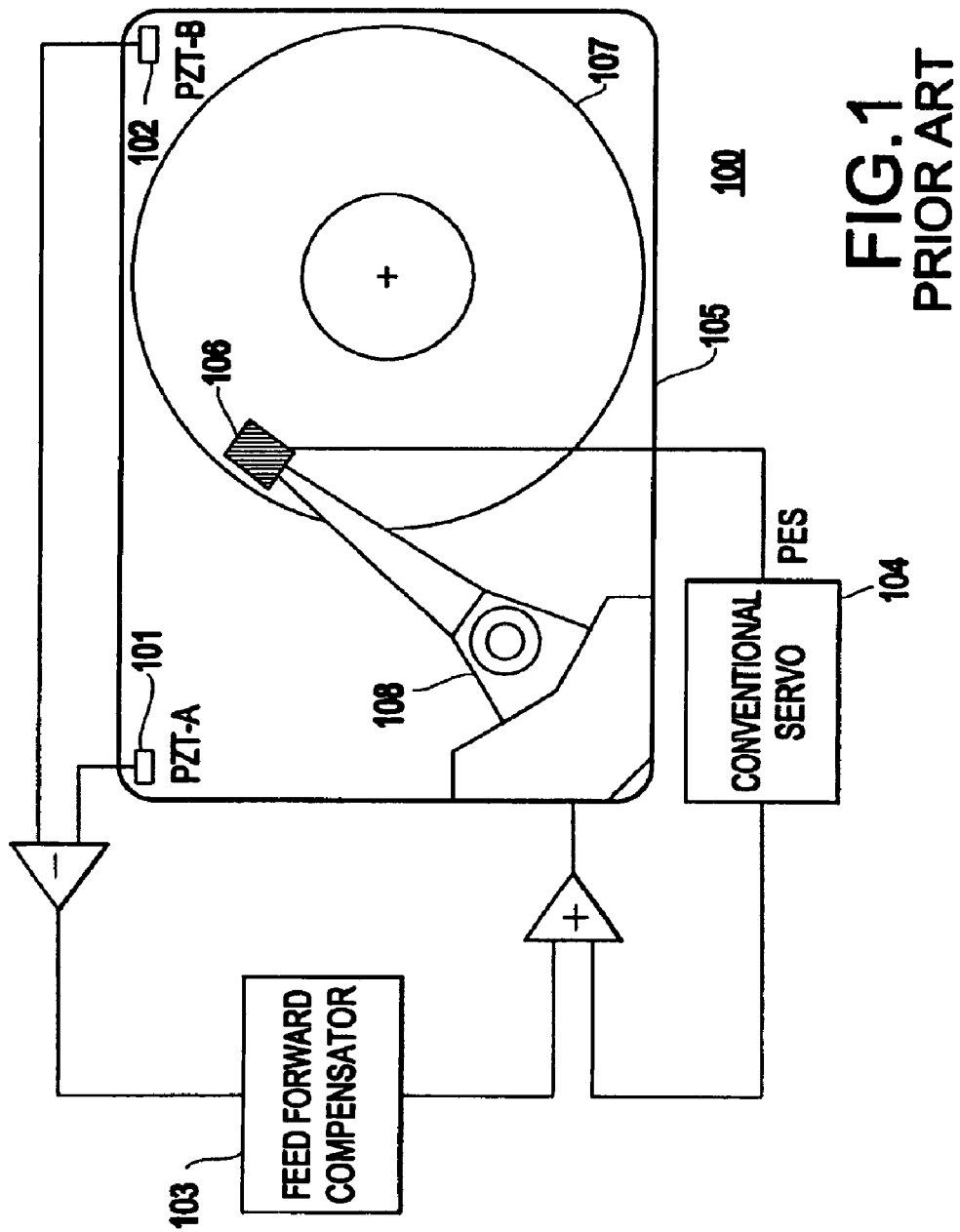
FIG. 1 illustrates an acceleration feed forward control using a PZT sensors 101, 102 in a conventional arrangement.
Figure 2:
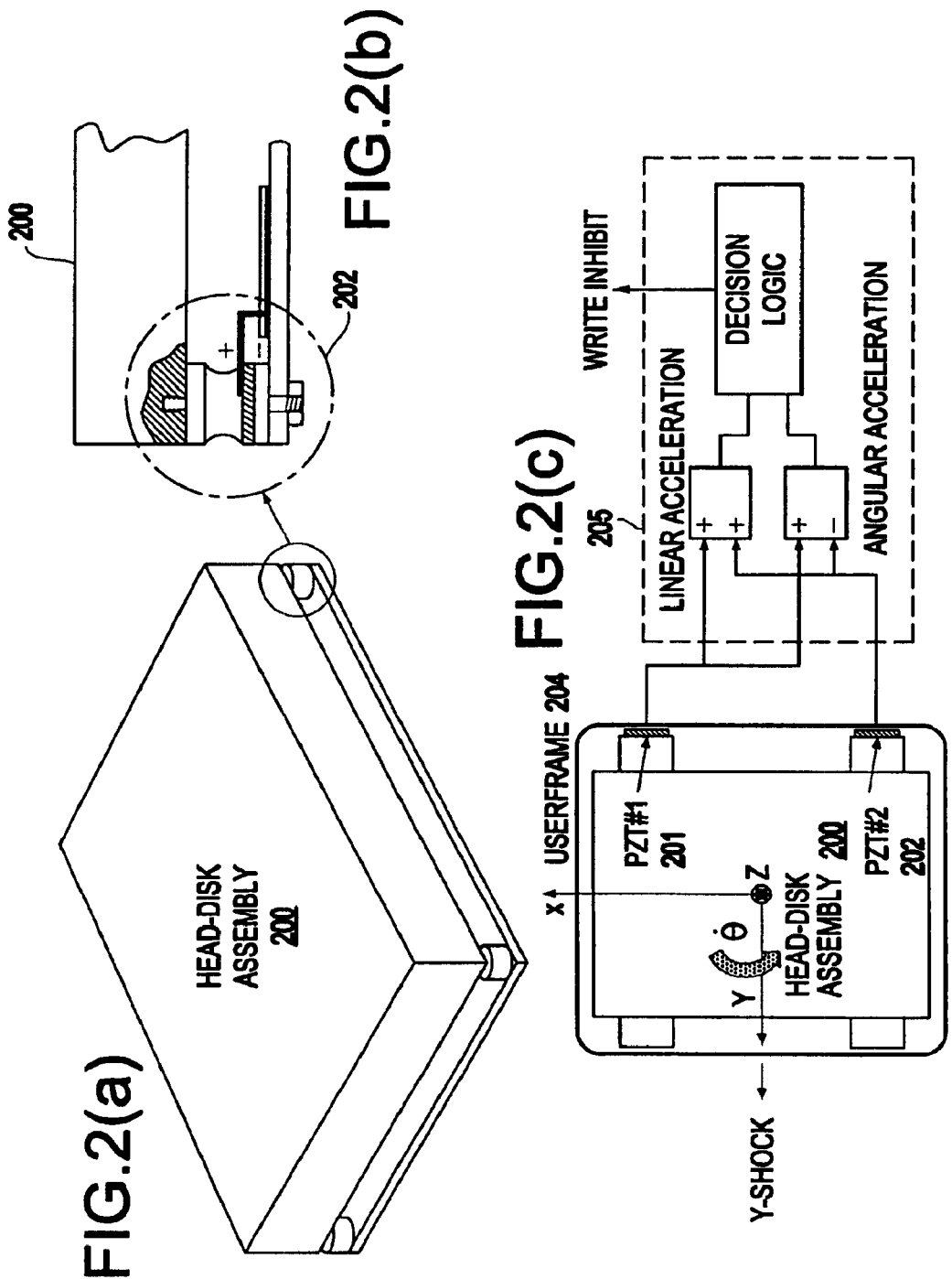
FIGS. 2(a)–2(c) illustrate the use of dual PZT sensors 201, 202 to detect angular acceleration as in a conventional arrangement.

Referring now to the drawings, and more particularly to FIGS. 3–14(d), there are shown preferred embodiments of the method and structures according to the present invention.

Preferred Embodiment

Figure 3:
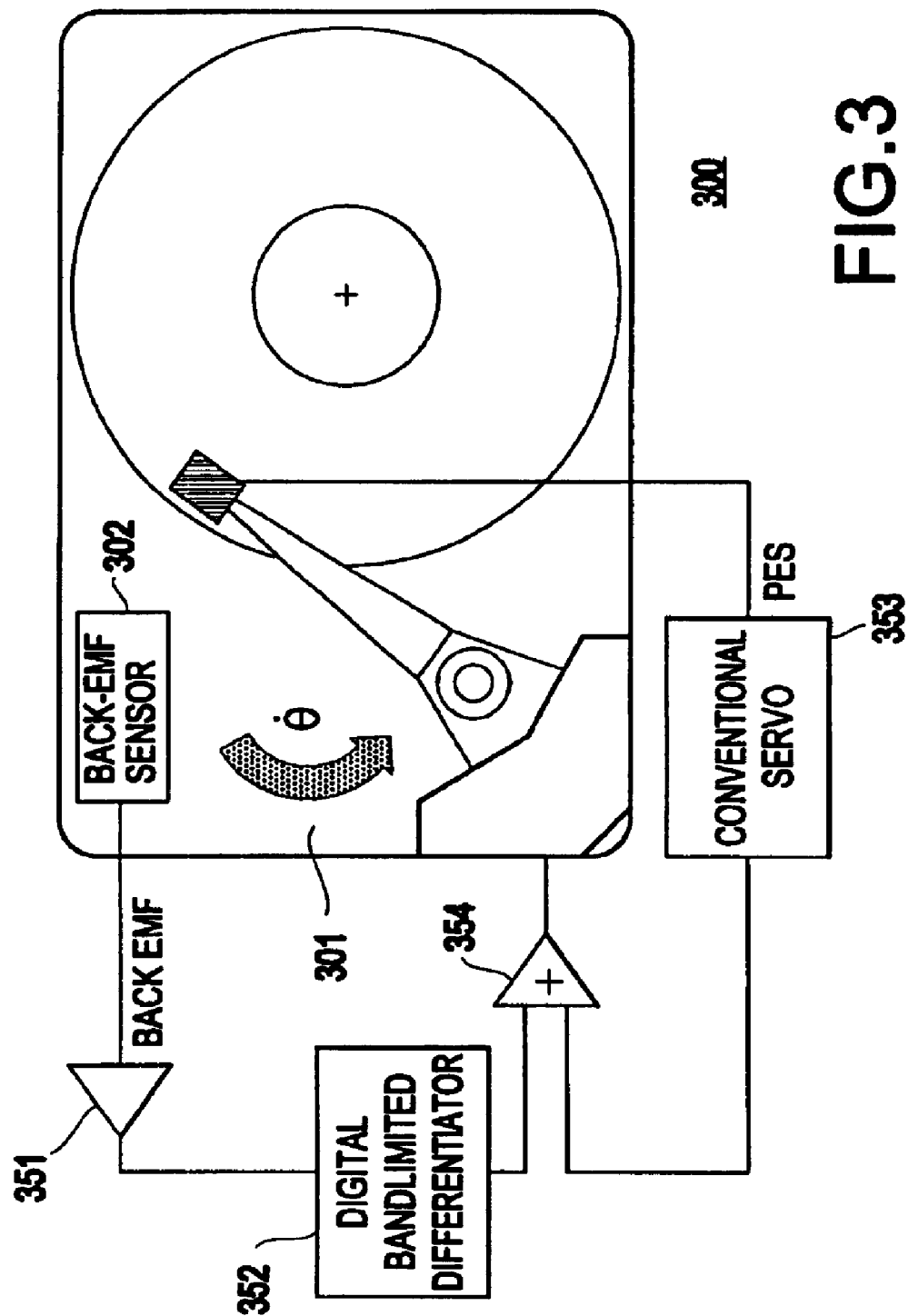
FIG. 3 illustrates a back-electromotive force (EMF) sensing arrangement and a feedforward loop (algorithm) in a disk drive 300.

Turning to FIG. 3, an actuator of a disk drive generates a reaction torque during a seek. In computer configurations where there are multiple drives arranged in the form of an array, the multiple reactions produced by the drives generate a vibration spectrum.

The form and magnitude of a vibration (e.g., both linear and rotational) spectrum is system-specific, but it tends to be a band-limited power spectrum interspersed with a finite number of harmonics. The base-plate vibration, especially along X, Y and about Z (e.g., coordinate theta) can contribute to TMR.

As mentioned above, a major contribution to TMR comes from theta-dynamics. The actuator mass imbalance contributes to TMR through the torque disturbance produced by the linear vibration of the actuator pivot, but nominally the imbalance amount is negligible.

Compliance of the spindle motor bearing can also produce undesirable TMR due to X, Y vibration of its axis of rotation. The spindle bearing component is expected to become worse in the case of a fluid dynamic bearing instead of ball bearings.

The present invention strives to minimize the TMR error produced by theta-dynamics by an algorithm that uses a rotational velocity sensor. A rotationally-sensitive back EMF sensor 300 is used to develop and demonstrate the effectiveness of the algorithm as shown in FIG. 3(a). (It is noted that innovations required to make such a sensor feasible in a low cost disk drive are presented in the above-mentioned copending U.S. patent application Ser. No. 10/153,687, incorporated herein by reference.)

The terms "feedback" and "feedforward" refer to general principles known in the field of control systems. The conventional systems (e.g., as disclosed in U.S. Pat. No. 5,400,196 and Japanese Patent No. 2,565,637) employ a feedforward method in which the angular acceleration of the base-plate is measured, and the same angular acceleration is applied to the actuator arm to reduce or eliminate the corresponding TMR component. The measured RV acceleration is modified by a gain parameter (with a noise reduction process), and is applied to the VCM actuator.

Thus, to realize a solution, a good quality RV acceleration sensing technology is required. The algorithm used in itself is simply a gain adjusting operation. Nevertheless, due to signal conditioning needs, innovation can be made to enhance the feedforward algorithm, for example, in the area of signal noise reduction.

The present invention preferably uses a back EMF-based RV velocity sensor which is easy to develop and less costly to fabricate. The present inventors have recognized that any limitations posed by an acceleration sensor can be removed if an algorithm (e.g., a method) can be found that will exploit an RV velocity sensor.

A velocity sensor that will only be sensitive to angular motion along the theta-coordinate can be designed using the same experience in designing a disk drive main VCM actuator. Therefore, an algorithmic solution (e.g., assuming the availability of a back EMF sensor or the like) is pursued in the present invention.

An industry grade computer housing tends to have TMR producing resonance in the range of about 100 to about 1000 Hz. The storage industry trend is to produce disk drives that have shorter than 10 ms full seek time and less than 5 ms ⅓ seek time. This characteristic trend implies that the random excitation frequency is expected to be not lower than 100 Hz. On the highest frequency spectrum, a single track seek of 1 ms corresponds to 1 kHz (and the strength of the seek pulse is not as severe as that of a full seek.)

Therefore, the random vibration excitation at any point on a computer frame is bound to be between about 100 Hz to about 1 kHz. A cooling system such as a fan produces a 60 Hz vibration which is handled by the conventional servo loop. Therefore, the worst case excitation is likely to be within 100–1000 Hz, with most likely events occurring around 200–800 Hz range due to ⅓ or shorter seek lengths.

Thus, the present invention aims to develop an algorithm that is effective in its feedforward mode (e.g., preferably in the 100–1000 Hz range). The realization that the algorithmic solution need not be effective in the lower (<100 Hz) and upper frequency (>1000 Hz) ranges makes a RV velocity-based algorithmic solution feasible in the case of an HDD. This non-obvious requirement facilitates a practically realizable solution. Any reference to middle frequency band in this invention corresponds to 100–1000 Hz.

As shown in the disk system 300 of FIG. 3, the RV velocity of a base-plate 301 is measured by a back EMF sensor 302, and the voltage produced by the sensor 302 is amplified (e.g., by a high gain amplifier 351) and digitized (e.g., by digital band-limited differentiator 352) for an internal algorithm to operate on. A conventional servo 353 is also shown for receiving the position error signal (PES) and coupled to an amplifier (integrator) 354.

It is noted that the structure of the sensor configuration of FIG. 3 is merely exemplary and the invention is not limited thereto.

Thus, the structure of FIG. 3 takes into account (and attempts to overcome) that measuring/sensing the angular acceleration can be costly and sometimes inappropriate, since the motion may take the form of not only in-plane motion, but also simultaneously may take the form of linear vibration along many coordinates. Hence, cross-coupling may occur with the use of the conventional PZT sensors.

The inventors have recognized that the conventional PZT sensor has such problems, and thus have developed the method disclosed herein with the back-EMF sensor which functions on a different principle from the PZT sensor. The structure of the inventive back-EMF sensor is described in the above-mentioned copending U.S. patent application Ser. No. 10/153,687.

It is noted that, while a structure of a back-EMF sensor and moving a coil in a magnetic field and a back-EMF is picked-up (e.g., a basic physics principle) are generally known, there has been no known use of a back-EMF sensor for detecting angular motion/acceleration in a disk drive.

Thus, applying a back-EMF for the purposes of the present application/problem (e.g., detection of the rotational/angular motion in a disk drive) is novel and unique. Indeed, the actuator itself pivots around a point and if one moves the actuator and uses a voltage meter thereat, a voltage signal will be produced. However, no such configuration has been used in such a mode from the actuator standpoint (or employed before). As described in the copending application, the back-EMF sensor may include a coil for back EMF sensing, magnets for producing an air gap flux, a low friction pivot, a mass for balance, etc.

Turning now to the plots of FIGS. 4(a)–4(d), these Figures show how to form the method/algorithm by systematic argument, and specifically, based on the insight into rotational dynamics in disk drives, components at lower frequencies (e.g., below a certain frequency such as 25 Hz), are not of interest due to conventional servo has sufficient gain or capability in handling errors or vibrations at those frequencies.

Hence, since the lower frequency band and higher frequency band are not critical for vibration solution, a high pass (HP) filter (e.g., as shown in the plot of FIG. 4(a)), and a low pass (LP) filter (e.g., as shown in the plot of FIG. 4(b)) are used to prepare the digitized voltage signal for further processing. Preferably, the filters are of 2nd order type with 25 Hz for highpass (HP) and 7 kHz for lowpass (LP) filtering functions. Thus, the signal is passed sequentially through the high pass filter and then the low pass filter.

The output of the LP/HP filter system is next modified to extract an "equivalent acceleration" information. However, a pure differentiation of the measured back-EMF signal is likely to produce a high level of noise at higher frequencies (~>5 kHz). The transfer function of an ideal differentiator will have 90 deg. phase and 20 dB per decade gain dependence in the frequency domain.

However, such a differentiator will amplify the sensor noise severely at a high frequency band, thereby producing undesirable disturbance to the head positioning actuator. Therefore, an algorithm to produce an optimum differentiating action is critical.

A band-limited differentiator (e.g., 352 as shown in FIG. 3) that will provide a differentiation function in the mid-frequency range is the target of the inventive algorithm. By choosing a first-order filter with 15 Hz as its "zero" and 7.5 kHz as its "pole", an effective band limiting differentiator 352 is designed whose characteristics is shown in the plot of FIG. 4(c).

In the case at hand, band limited differentiation avoids differentiation within a range of 1 kHz and 7 kHz to avoid noise being amplified (and thus degrading the signal) and the like resulting from the vibration-induced frequencies, thereby leading to error.

Instead, to achieve the equivalent differentiation process between 300 Hz and 1 kHz, then a differentiation will mean a 90-phase of an output signal coming out of the band-limited differentiator (the upper plot of FIG. 4(c)), then as shown in the lower box of FIG. 4(c) (e.g., representing the phase plot), then the phase below 100 Hz is shown as being between 20 and 60 degrees and is rising toward 80 degrees and then asymptotically rises toward 90 degrees. However, the high frequency signals are desirably limited and thus the phase rolls off to 0 degrees phase at a fairly high frequency (e.g., 8–9 kHz).

Thus, it is desired to provide a meaningful differentiator in the 100–1000 Hz range (e.g., everywhere else the signal is actually being corrupted in that everywhere else the signal is being distorted due to the phase change and limiting the amplitude of the signal by performing the high pass and low pass filtering).

FIG. 4(d) illustrates the results (spectrum) of the high pass, low pass and band limited differentiation operations of FIGS. 4(a)–4(c). As clear, the approximate 90 degree phase is shown at 100 Hz, whereas the phase is slightly below 80 degrees at about 1000 Hz. Thus, within a ±10 degrees phase lead, the invention can reach its desired Hz range (e.g., 100 to about 1000 Hz). Hence, enough differentiating action can be obtained with enough phase lead at approximately 90 degrees phase.

Thus, it is seen that the phase lead in the mid frequency band is between 75 and 95 degrees. Beyond the mid-frequency range, the phase requirement is violated by the inventive algorithm. However, the expected RV spectrum does not require algorithm effectiveness beyond this range. The 25-Hz HP filter removes drift in the signal at lower frequencies, but the choice of the LP frequency can be chosen with some flexibility depending on the sensor system employed. Further, the same argument applies for the LP frequency as well.

It is noted that a key feature of the invention, as shown in FIGS. 4(a)–4(d) is that the high pass and the low pass filter are each preferably second order filter blocks, whereas the band limited differentiator is preferably a first order filter block.

Thus, the three blocks can be realized by three separate filter stages. Alternatively, the three stages can be combined into a single order (e.g., a fifth ($5^{th}$) order polynomial) block. If three stages are desirable, any combination of the HP, LP and BLDIF can be employed so long as it the combination of stages are equivalent to a $5^{th}$ order. It is further noted that if any of high pass filtering (or low pass filtering) is not desired, then a $4^{th}$ order block and $1^{st}$ order block could be employed.

Notwithstanding the above, it is further noted that the polynomial preferably has the shape of FIG. 4(d) optimally realizing the $5^{th}$ order filter and possibly realized by a slightly lower or slightly higher order model fit. That is, the models can be fit to the shape of the plot of FIG. 4(d) with slightly lower, or slightly higher, orders and still can achieve the same level of functionality.

Hereinbelow is discussed how the filters should be sequenced with respect to each other, and how the sampling rate for the filter stages should be chosen. To manage practical implementation of digital filters, it may be necessary to select sampling rates that are different from the conventional controller.

Figure 5:
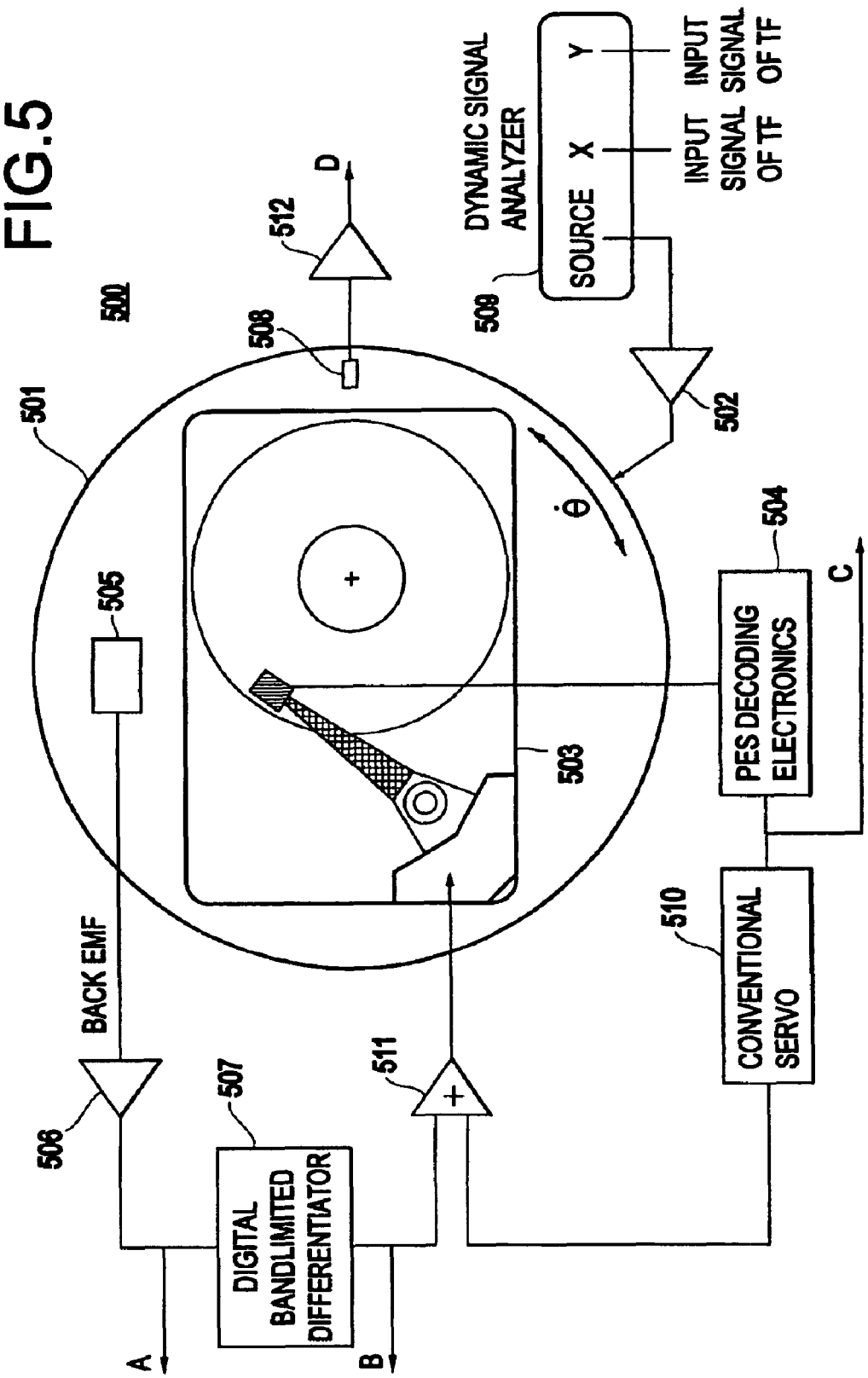
FIG. 5 illustrates an experimental setup to evaluate the merit of RV controllers and sensors.

FIG. 5 shows a schematic of an experimental (laboratory) setup of a system 500 according to the present invention. A circular platform includes an RV table 501 which is driven by a current driver 502/table-actuator system (e.g., table-actuator not shown). The HDD 503 under evaluation is mounted on the table 501 with its base-plate facing up so that access to the drive electronics is made available.

As shown in FIG. 5, a head signal (unreferenced) is extracted from the electronics 504, and the required PES is decoded through a custom built PES decoding circuit 504.

An onboard controller of the HDD 503 is disabled for the experimental purposes, and an external signal processing system is used as a controller. The external controller implements a conventional PID-like controller in the track follow mode. A conventional servo 510 is shown for providing an input to an amplifier 511. Signal C represents an error signal indicating the error between the head and the track.

The digital bandlimited differentiator 507 provides another input to the amplifier 511 which performs the comparison and then provides a drive signal to the VCM/actuator (unreferenced).

A back EMF sensor 505 (e.g., similar to 302 shown in FIG. 3($a$)) is fabricated and mounted on the table 501 away from the center of rotation of the RV table 501 (center of the circle) and the generated voltage due to RV is amplified by a high gain (~1000) circuit 506.

The RV back-EMF output is fed through the high gain amplifier 506 to a digital signal processing system (e.g., same as the one that implements the track follow controller) where the band-limited differentiator 507, is implemented.

To set a reference for vibration sensing, a single, high quality PZT accelerometer 508 is employed which provides a signal through an amplifier 512.

The dynamic signal analyzer (e.g., DSA) 509 provides a transfer function measurement capability. Various signal points (A, B, C and D) are connected to the DSA 509 for the analysis of the data. That is, various forms of transfer functions can be examined such as looking at the ratio of signal C to signal D, the ratio of signal B to signal A, etc.

Figure 6A:
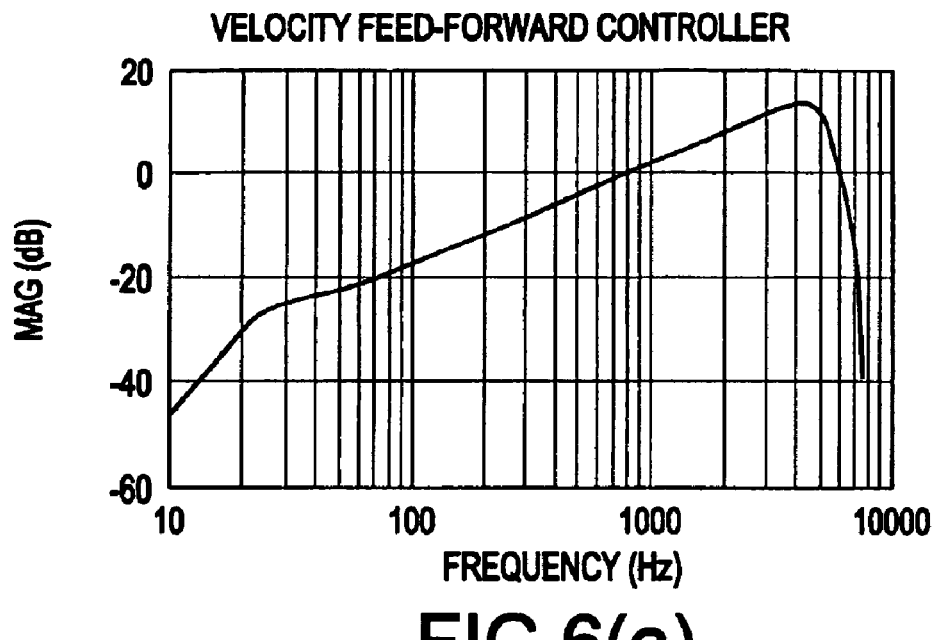
FIGS. 6(a)–6(b) illustrate a measured transfer function of the band-limited differentiator-based RV controller.
Figure 6B:
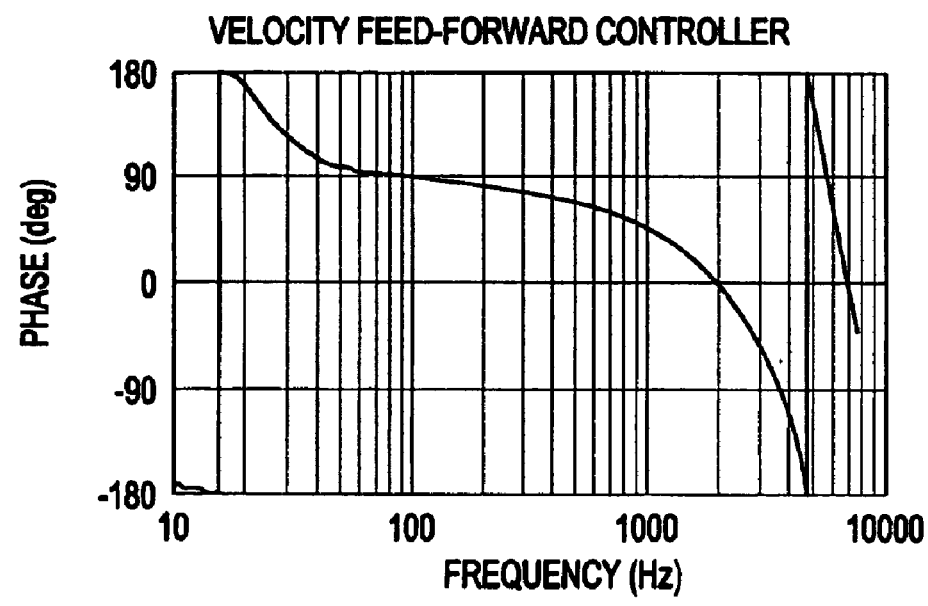

FIGS. 6($a$)–6($b$) show the measured transfer function of an RV velocity sensor-based controller (e.g., the ratio of point B to point A in a frequency domain). As such, the controller corresponds to the computed transfer function (polynomial) of the plot of FIG. 4($d$) (e.g., the upper and lower plots of FIG. 4($d$)).

If v(n) is the input to the controller (e.g., point A of FIG. 5) and y(n) is the output of the controller (e.g., point B of FIG. 5), the effective time domain computation (e.g., a fifth order polynomial) for this implementation is as follows:

$$y(n)=k1\ v(n)+k2\ v(n-1)+k3\ v(n-2)+k4\ v(n-3)+k5\ v(n-4)-k6\ y(n-1)-k7\ y(n-2)-k8\ y(n-3)-k9\ y(n-4),$$

where n, n−1, . . . correspond to time delayed samples of the respective variable and k1, . . . k9 correspond to gains which are chosen to produce the desired characteristics according to the present invention The gains are generally constant but can be updated to enhance the algorithm effectiveness depending on the drive system characteristics or vibration environment.

The above equation is a composite equivalent of the HP, LP and BLDIF filters. In HDD systems with floating point arithmetic, this equation can be directly implemented. In the case of HDDs with low power, integer arithmetic processors, it may be necessary to keep each filter function as an independent signal processing block, as discussed below.

Figure 7A:
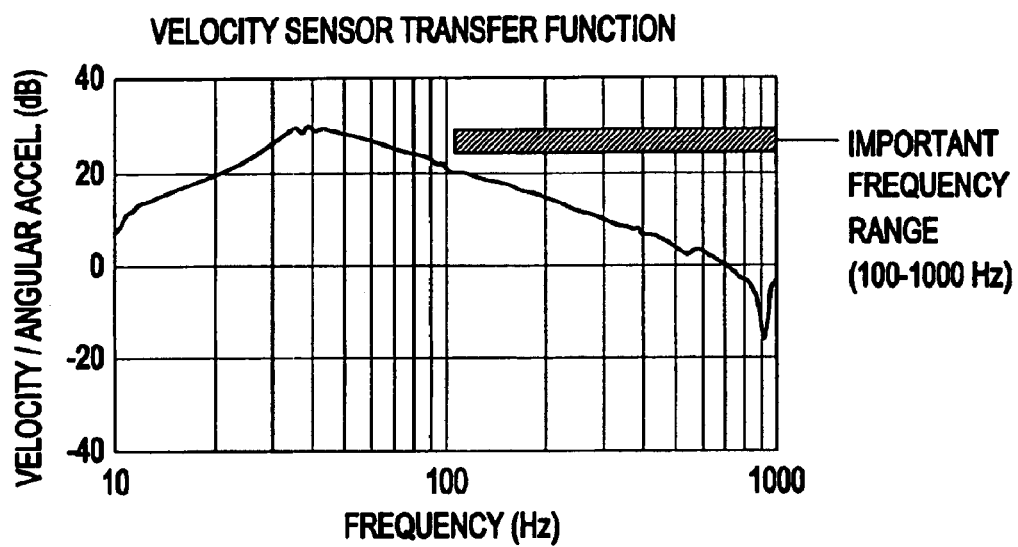
FIGS. 7(a)–7(b) illustrate a measured transfer function of a back EMF sensor (input=RV acceleration, output=back EMF)
Figure 7B:
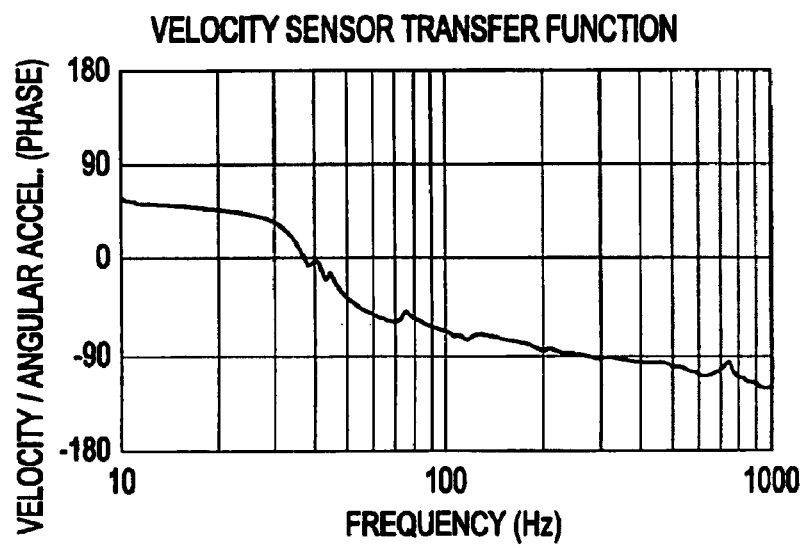

FIGS. 7($a$) and 7($b$) show the measured transfer function of a back EMF sensor (e.g., 505 in FIG. 5) used in the implementation of the RV controller algorithm (e.g., a ratio of signals at points A, reflecting the output, and D, reflecting the input). Thus, velocity over angular acceleration is measured over the frequency domain.

The output is the voltage (after an amplification) of the back EMF sensor 505 and the input is the voltage corresponding to an applied rotational acceleration to the sensor 505 as measured by a high quality linear accelerometer 508 mounted on a RV table (e.g., 501 in FIG. 5).

It can be observed that at frequencies lower than approximately 40 Hz the sensor characteristics is dominated by the pivot stiffness. Beyond approximately 40 Hz, the sensor's characteristics are dominated by its inertia.

The phase characteristics shown in FIG. 7($b$) show the effect of pivot-induced damping. Ideally, the sensor should provide a 90-degree phase lag with 20 dB/decade magnitude roll off in order to extract the rotational velocity of the platform on which it is mounted. In the mid-frequency range of 100 Hz to 800 Hz, the sensor characteristics meet this requirement closely, but not exactly. Thus, further experimental evaluation is required to uncover the non-obvious potential of this sensor/controller configuration.

It is again noted that the frequency range most of interest to the invention is in the range of about 100 to about 1000 Hz, as shown in FIGS. 7($a$)–7($b$). That is, most of the activities of the interest to the present invention are within this range.

For example, the typical disk housing will have a track misregistration resonance (TMR) within a frequency range of about 100 to about 1000 Hz. Typically, a 5 ms seek (creating a square pulse 5 ms., which is an average seek time currently) corresponds to 200 Hz, whereas a 10 ms seek corresponds to 100 Hz. Other pulses which are used are between 1 ms and 3 ms. 2 ms pulses corresponds to about 500 Hz. Typically, there are no seeks which are less than 1 ms (e.g., which corresponds to about 1 KHz).

Thus, the effective part of the sensor operates within the range of about 10–1000 Hz. As such, the sensor of the invention utilizing the inventive method can be used as a stand-alone sensor.

Figure 8:
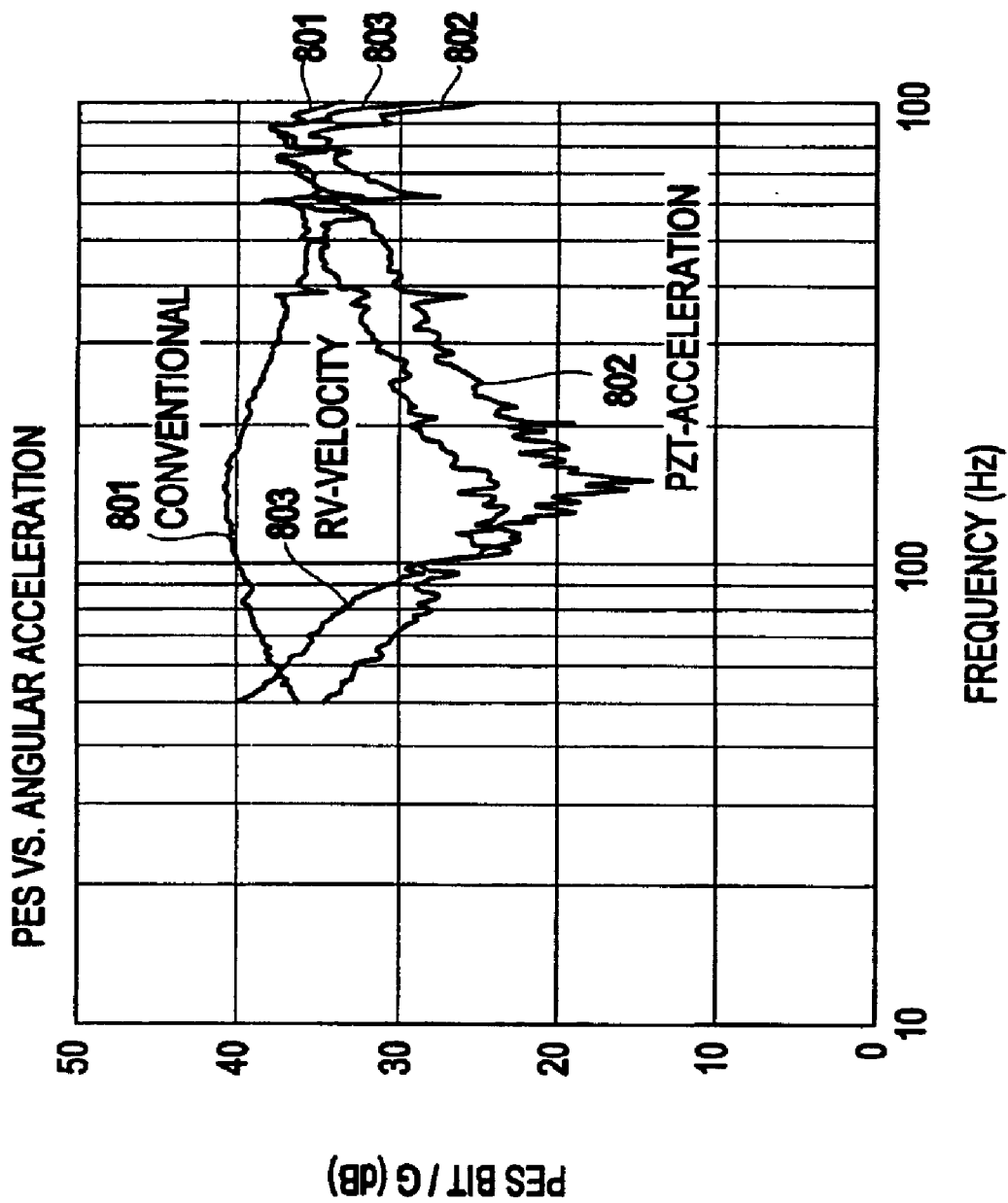
FIG. 8 illustrates measured transfer function of input-RV acceleration to position error signal (PES) under various control conditions.

FIG. 8 shows the effect of RV on PES under three conditions. That is, FIG. 8 shows the ratio of the output PES (e.g., signal C in FIG. 5) to input RV (e.g., signal B as measured by the PZT output).

The conventional case 801 is the waveform with no RV acceleration or velocity sensing for control compensation (e.g., no feedforward). Thus, for one unit input G (e.g., at 100 Hz, 40 dB), one track width error in the position error signal (PES—signal C) is equal to 256 bits. Hence, 100 bits will be equal to about one-half the track width. Thus, 40 dB (1G) will equal to 100 bits in the conventional case and the conventional servo loop structure will be unable to remedy the problem.

The next case 802 establishes the best configuration with a high sensitivity PZT (e.g., high cost, dual PZT sensors) where the PZT signal is LP and HP filtered and fed forward to the actuator. Thus, performance is good as shown by the PZT-acceleration solution, but cost is very high and further the size increases.

An interesting case as shown in waveform 802 is that of RV velocity-based control. It can be observed that both sensors produce similar vibration rejection characteristics, but the back-EMF sensor (e.g., shown by curve 803) produces less attenuation (~8–10 dB) than the PZT-based control. Further, the back-EMF sensor is much less expensive and the size is less than the PZT solution and the space available can be exploited within the disk drive's mechanical components.

It was found that the back-EMF sensor design can be optimized to produce performance that is comparable to the best PZT system. In fact, the back-EMF based configuration produces enhanced compensation at lower frequency from 150 Hz and downwards. Fundamentally different sensing and control structure causes the variation in the transfer function (TF). The TFs were obtained using swept sine method.

Figure 9A:
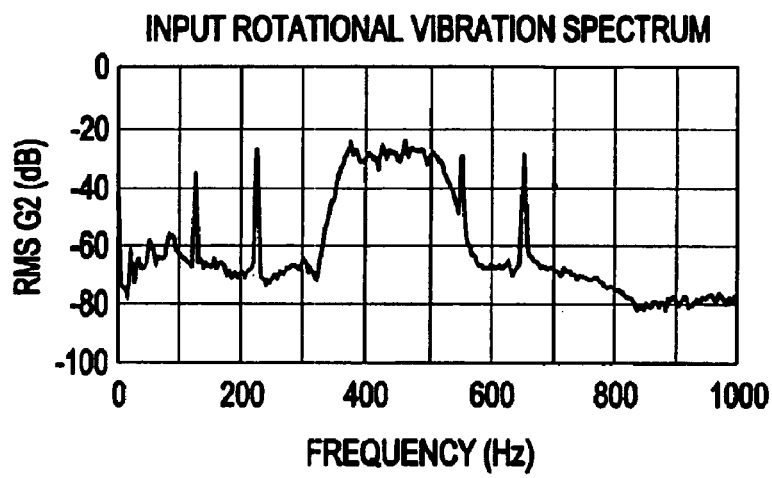
FIGS. 9(a)–9(b) respectively illustrate a frequency spectrum of an input RV vibration and a corresponding performance of PES (1-sigma)
Figure 9B:
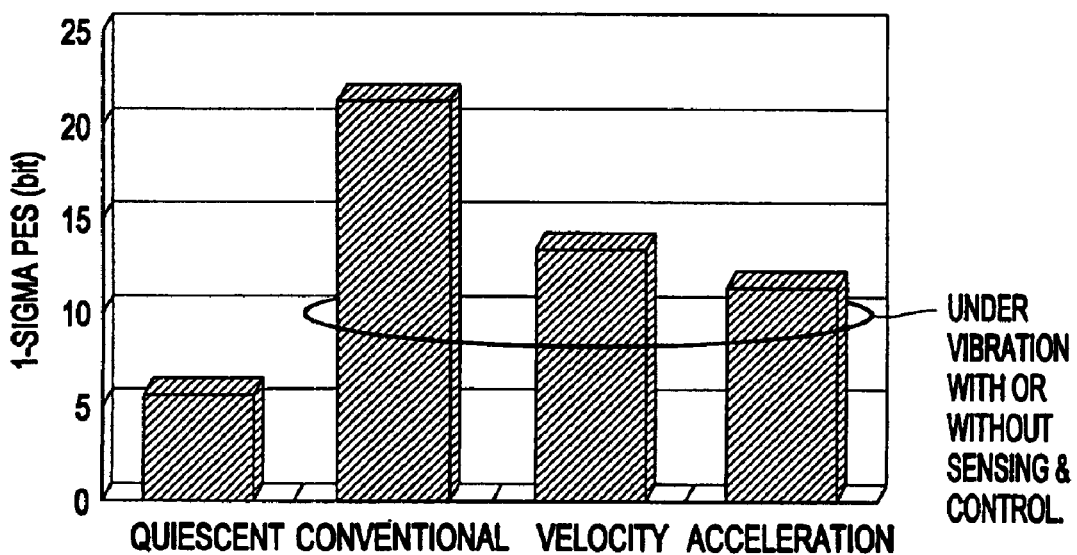

FIGS. 9(a)–9(b) show the performance due to random rotational vibration. FIG. 9(a) shows an experimentally generated random RV spectrum. The spectral characteristics are generated using a specially programmable waveform generator and it mimics a typical RV characteristics observed in a server system. As shown, the vibration spectrum has a hump at about 300 to about 600 Hz, generated by exciting a table in the laboratory.

FIG. 9(b) shows performance due to random rotational vibration, and more specifically shows the corresponding PES (1-sigma) value for an input RV value of 22.8 r/s$^2$. It is shown that, under conventional control, the PES value quadruples to 21 or 22-bits (1-sigma).

With RV velocity-sensor based control, it drops to 12 or 13-bit (13 dB) and, with near ideal PZT (e.g., with high-quality, high-cost dual PZT sensor arrangement), it improves further to 11-bit (11 dB). With no vibration, there will be 6 bits observed (e.g., under quiescent conditions with a conventional servo arrangement).

FIG. 10(a) shows the corresponding power spectrum of PES (e.g., the server random vibration PES spectrum). The effectiveness of the RV sensor based control from about 60 Hz to 1000 Hz can be seen.

The details of the random RV-based PES in the band defined between 350 to 525 Hz is shown in FIG. 10(b). The progressive reduction in PES power density between each configuration (e.g., conventional, RV Velocity, and PZT Acceleration) is observable. That is, the rejection between quiescent and compensated shows an advantage in the 200–300 Hz range. Further, in the portions of the "hump", there is shown a reduction in the amplitudes (e.g., see the hump in FIG. 9(b) for the 1-sigma value).

Figure 11A:
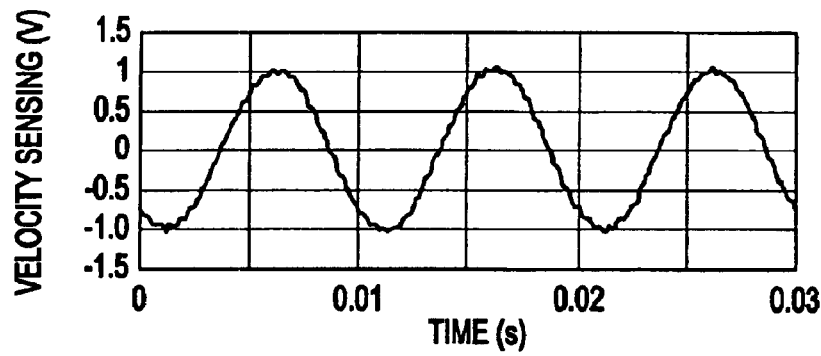
FIGS. 11(a)–11(c) illustrate response to sinusoidal excitation at a fixed frequency, and more specifically
Figure 11B:
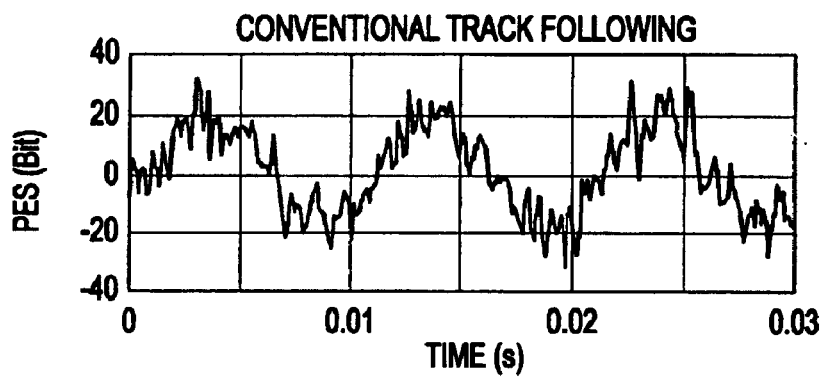
Figure 11C:
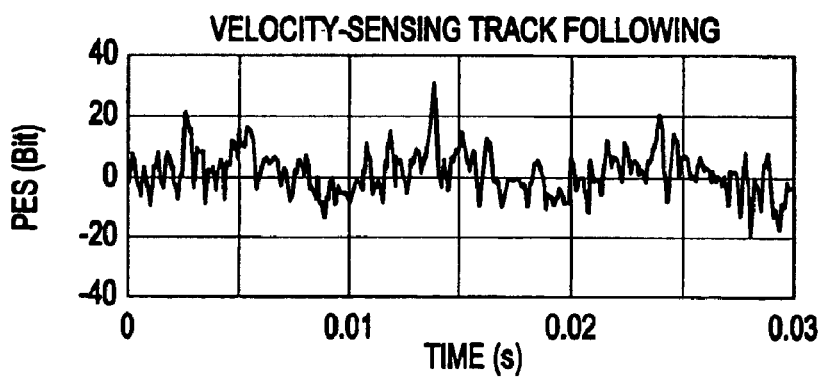

FIGS. 11(a)–11(c) show the effect of fixed sinusoidal RV excitation (e.g., sinusoidal angular vibration of 100 HZ at 18.6 rad/s$^2$) with and without an RV velocity sensor-based controller. FIG. 11(a) shows the velocity sensor accepts the vibration input and which outputs the signal.

A substantial reduction in PES amplitude can be observed in a comparison of FIG. 11(b) which shows the conventional servo track following, with FIG. 11(c) which shows the velocity-sensing track following (e.g., with feed forward).

Figure 12:
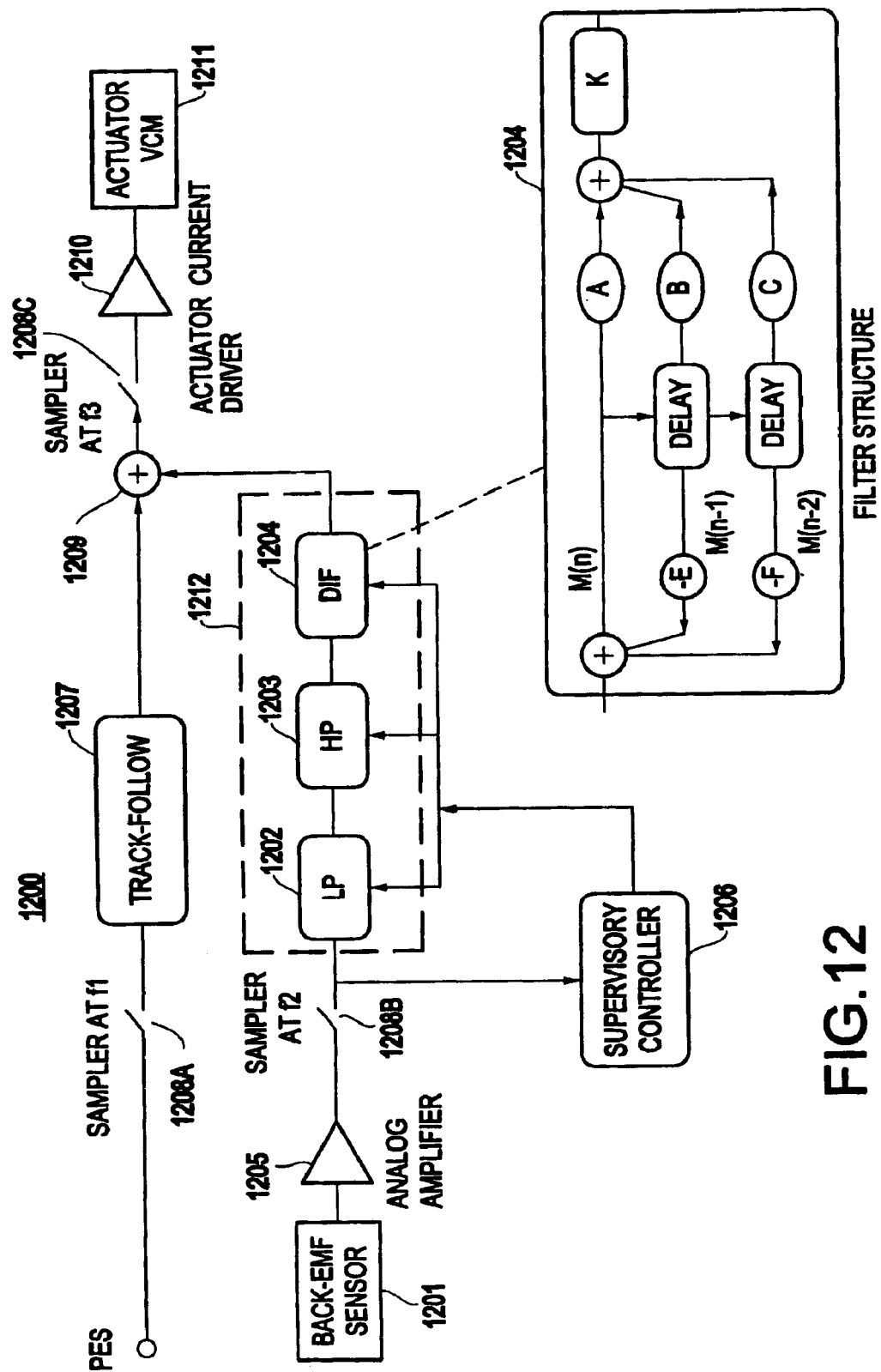
FIG. 12 illustrates a structure of the RV velocity feedforward algorithm according to the present invention.

FIG. 12 shows a practical implementation of a system 1200 having a back-EMF sensor 1201 and a corresponding filter sequence including LP 1202, HP 1203, and DIF 1204. Use of LP 1202 as the first stage promptly removes all the high frequency components. The sampling frequency f2 can either be equal to the conventional controllers frequency f1 or can be different. A higher sampling rate would desirably reduce the phase loss in the mid-frequency range.

However, the trade-off is that the HP and BLDIF filter coefficients (A, B, and C) could become large as the separation between sampling rate and corner frequencies (e.g., such as 15 Hz for BLDIF and 25 Hz for HP) becomes large. Large coefficients are hard to contain with a process having a finite integer word length. Hence, the freedom to choose the f2 to meet the implementation constraint is important. The need to choose filter frequency can be extended to include cases where each filter HP, LP and BLDIF are executed at a different frequency to meet the finite word length limitation.

The post-filter gain "k" in FIG. 12 can be used as a switch (e.g., "k=0" means no feedforward control) when vibration compensation is not warranted. In situations where a single HDD is used, the random vibration may not be substantial and the feedforward operation can be disabled by a supervisory controller that can read the RV velocity sensor and set the gain k=0.

FIG. 12 also shows an analog amplifier 1205, a supervisory controller 1206, a track-follower 1207, as well as various samplers 1208A, 1208B, and 1208C, a summing circuit 1209, actuator current driver 1210, and an actuator VCM 1211.

It is noted that FIG. 12 shows that the invention can be implemented with either all analog electronics, all digital electronics, or a combination thereof. Digital electronics is preferable since there is the capability of programming the device (e.g., after manufacturing).

It is further noted that the implementation of the filtering in FIG. 12 is merely exemplary. That is, as described above, the combination of the LP, HP, and/or DIF are simply a "black box" representing a fifth-order polynomial (e.g., using the equation above) filter 1212, and the components therein can be considered as low order filter stage 1, stage 2 and stage 3 components, as described above.

With the unique and unobvious aspects of the present invention, as described above, a method (algorithm) has been developed which functions based on the back-EMF signal derived from an independent sensor. It is noted that the main actuator VCM also produces a back-EMF, but is subject to contamination by the track-following control activity. Through intelligent electronics, the two components of the back-EMF (i.e., track follow and RV) can be separated. Thus, the back-EMF of the main actuator can be taken advantage for control augmentation or RV estimation.

Figure 13:
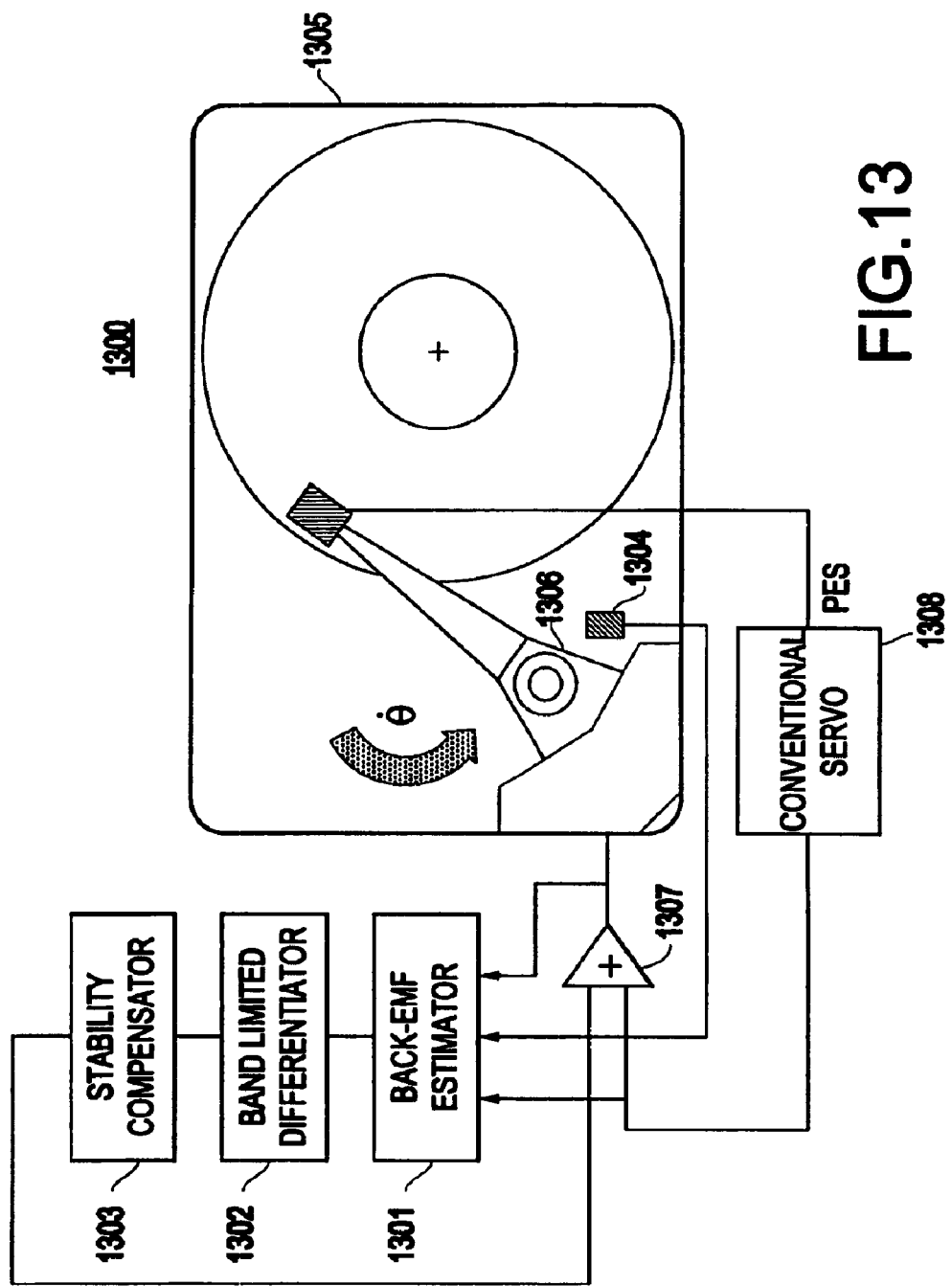
FIG. 13 illustrates a main actuator voice coil motor (VCM) as a back-EMF generator.

FIG. 13 illustrates a general configuration of a system 1300 in which a main actuator back-EMF is used for RV control.

In FIG. 13, the back-EMF estimator 1301 receives a total actuator current command, a track-follow current command and a HDD temperature (if a sensor 1304 is available) information at a selected sampling rate. The output of this block is an estimate of the back-EMF corresponding to the relative motion between the base-plate 1305 and the main actuator VCM 1306. The BLDIF 1302 and stability compensator 1303 blocks complete this second feedback loop. Also shown are an amplifier 1307 and a conventional servo 1308.

It is shown that the motion of the actuator due to the track-follow command should not be neutralized by this second control loop (e.g., through components 1301, 1302, and 1303). It is noted that a limitation of this method shown in FIG. 13 is that the PES and the back-EMF derived from the same main VCM actuator are not independent, and the use of back-EMF as a second feedback loop in addition to the conventional feedback could lead to conflicting control or even instability. However, by developing new algorithms, RV enhancement can be achieved.

FIGS. 14(a)–14(d) illustrates the effect of a transient vibration pattern on the response of the velocity sensor for use with the invention.

Figure 14A:
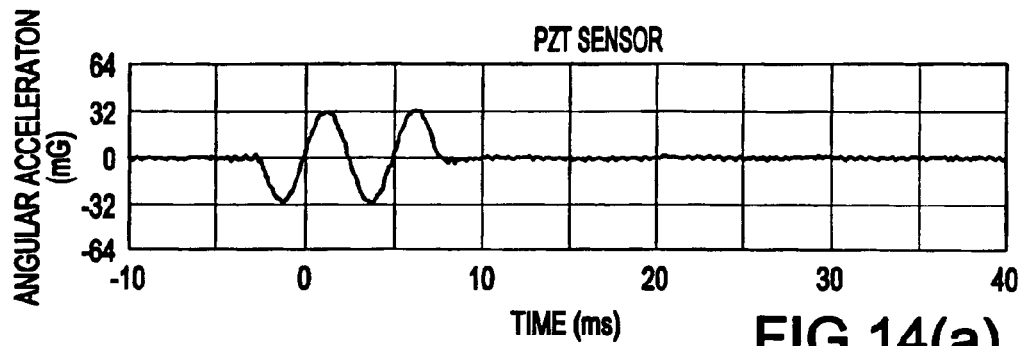
FIGS. 14(a)–14(d) illustrates the effect of a transient vibration pattern on the response of a conventional PZT sensor (FIG. 14(a)) and on a velocity sensor for use with the invention (FIG. 14(b)), and a corresponding actuator position error with no feed forward compensation and the position error signal (PES) over time (FIG. 14(c)), and the improvement of the PES with feed forward compensation (FIG. 14(d)).
Figure 14B:
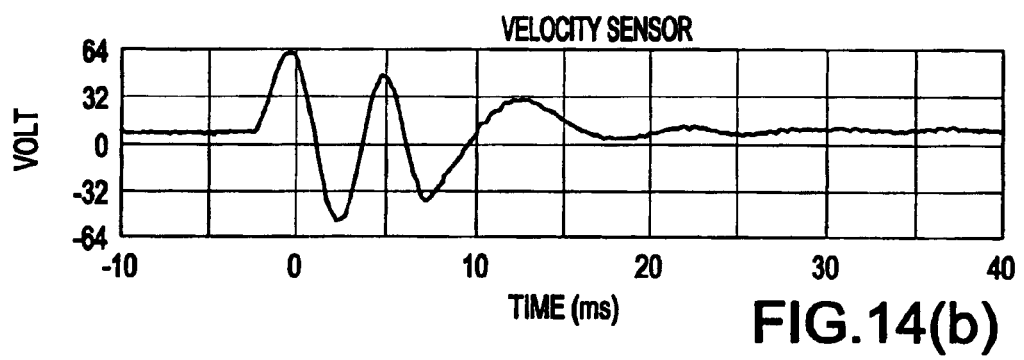

Specifically, FIG. 14(a) shows the response of a conventional PZT sensor, whereas FIG. 14(b) shows the response of a velocity sensor according to the invention.

Figure 14C:
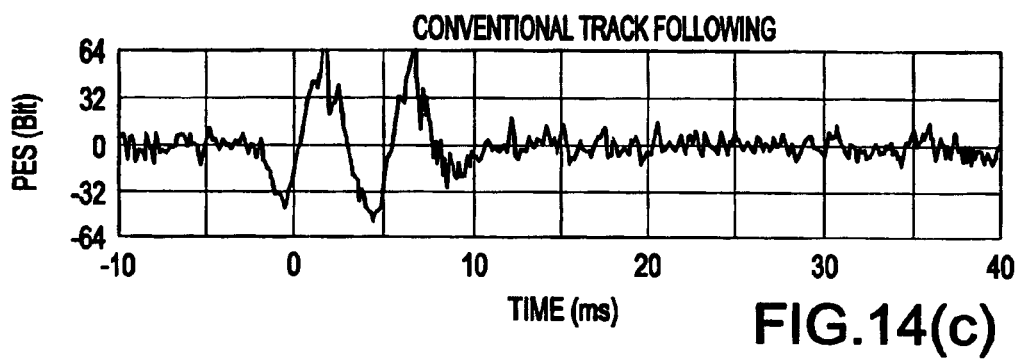
Figure 14D:
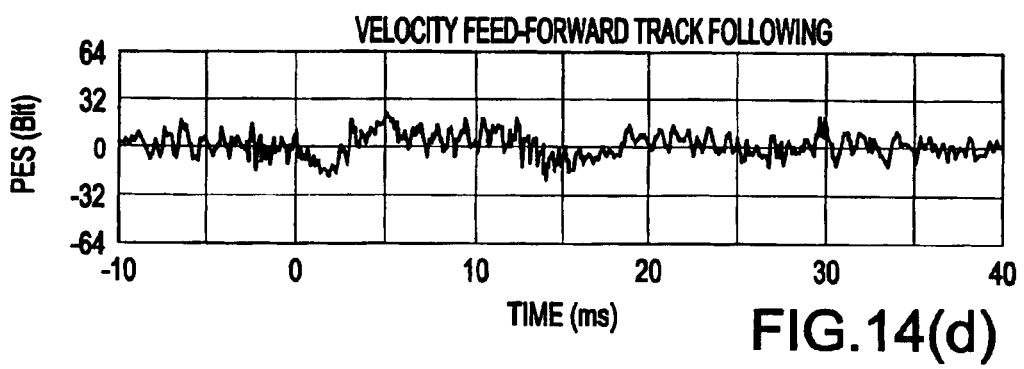

Additionally, FIG. 14(c) illustrates corresponding actuator position error with no feed forward compensation and the PES over time, whereas FIG. 14(d) illustrates the improvement of the PES with feed forward compensation.

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

This signal-bearing media may include, for example, a RAM contained within a CPU, as represented by the fast-access storage for example. Alternatively, the instructions may be contained in another signal-bearing media, such as a magnetic data storage diskette, directly or indirectly accessible by the CPU.

Whether contained in the diskette, the computer/CPU, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

While the invention has been described in terms of several preferred embodiments, those skilled in the art will recognize that the invention can be practiced with modification within the spirit and scope of the appended claims.

While the invention has been described in terms of several preferred embodiments, those skilled in the art will recognize that the invention can be practiced with modification within the spirit and scope of the appended claims.

What is claimed is:

1. A disk drive (HDD) subject to linear and rotational vibration, comprising:
    a back-electromotive force(EMF) sensing unit for sensing a rotational velocity component of the rotational vibration in a predetermined frequency range; and
    an optimal filter combination coupled to said back-EMF sensing unit for receiving an output from said sensing unit, said optimal filter combination comprising a high pass (HP) filter, a low pass (LP) filter, and a band-limited differentiator (BLDIF); wherein the HP filter, LP filter and BLDIF are selectively sampled at a different frequency from each other.

2. The diskdrive of claim 1, further comprising: a rotational vibration (RV) velocity controller coupled to said back-electromotive force (EMF) sensing unit.

3. The disk drive of claim 2, wherein said RV controller includes at least one of a complete digital circuit and a complete analog circuit.

4. The disk drive of claim 1, wherein said RV controller is activated only when the vibration level exceeds a predetermined limit, thereby reducing a potential of unnecessary electrical noise being injected through a sensor circuit.

5. The disk drive of claim 1, further comprising: a RV Velocity sensor, wherein a sensitivity of the RV velocity sensor is minimized against linear vibration, and an output signal thereof is treated as resulting from RV excitation.

6. A disk drive (HDD) subject to linear and rotational vibration, comprising: an independent sensing unit for sensing a rotational velocity component of the rotational vibration in a predetermined frequency range; and an optimal filter combination for receiving an output from said independent sensing unit, wherein said optimal filter combination comprises a filter system having a fifth order polynomial, which includes a high pass filter, a low pass filter, and a band limited differentiator that are selectively sampled at a different frequency from each other.

7. The disk drive of claims 6, wherein the high pass filter and the low pass filter each comprise a second order filter block.

8. The disk drive of claim 6, wherein said high pass filter, said low pass filter and said band limited differentiator comprise three separate filter stages.

9. The disk drive of claim 6, wherein said high pass filter, said low pass filter and said band limited differentiator are combined into a single block.

10. The disk drive of claim 9, wherein said single block comprises a fifth order polynomial block.

11. A method of vibration compensation in a disk drive, comprising:
    extracting an angular velocity component in a mid-frequency range;
    performing high pass filtering, low pass filleting and a band-limited differentiation on said velocity component, the high pass filtering, low pass filtering and band-limited differentiation being sampled at different sampling rates from each other; and
    generating a control signal that reduces a track following positioning error.

12. The method of claim 11, wherein said angular velocity component is extracted from a back-electromotive force (EMF) sensing unit.

13. The method of claim 11, wherein said mid-frequency range comprises a range of about 100 Hz to about 1000 Hz.

14. The method of claim 11, wherein said disk drive includes a back-electromotive force (EMP) sensing unit, further comprising: activating a rotational vibration (RV) velocity controller only when a vibration level exceeds a predetermined limit thereby reducing a potential of unnecessary electrical noise being injected through said back-EMF sensing unit.

15. The method of claim 11, further comprising: minimizing a sensitivity of a rotational vibration (RV) velocity sensor against linear vibration and characterizing all output signals there from as resulting from RV excitation.

16. The method of claim 11, further comprising: using a back electromotive force (EMF) of a main voice coil motor (VCM) of said disk drive while considering feedback stability of said main VCM.

17. The method of claim 11, further comprising: optimally filtering said extracted angular velocity component.

18. The method of claim 17, wherein said optimally filtering uses a fifth order polynomial.

19. A method of measuring vibration in a disk drive system having a baseplate, comprising:
    deriving a back-electromotive force (EMF) voltage emanating from a sensor which is delivering back-EMF proportional to angular velocity components of the baseplate from the sensor,
    amplifying a voltage of the sensor sufficient to be analog-to-digital converted to form a digital signal; and
    providing the digital signal to an optimal filter combination for implementing a fifth-order polynomial having a particular shape, the optimal filter combination comprising a high pass filter, a low pass filter, and a bandlimited differentiator being sampled at different rates from each other.

20. The method according to 19, wherein said polynomial is implemented as a plurality of low order filters.

* * * * *